United States Patent [19]

Hoffman

[11] 4,327,912

[45] May 4, 1982

[54] TENNIS BALL

[76] Inventor: Allan C. Hoffman, 2891 Rumsey Dr., Riverside, Calif. 92506

[21] Appl. No.: 218,169

[22] Filed: Dec. 19, 1980

Related U.S. Application Data

[63] Continuation-in-part of Ser. No. 895,117, Apr. 10, 1978, Pat. No. 4,240,630.

[51] Int. Cl.³ .................. F16K 15/16; A63B 39/04
[52] U.S. Cl. .................. 273/61 R; 137/846; 273/61 D
[58] Field of Search ............ 273/61 R, 61 D, 65 D; 137/846

[56] References Cited

U.S. PATENT DOCUMENTS 3,155,110 11/1964 Hoffman .................. 137/846 X
4,240,630 12/1980 Hoffman .................. 273/61 D X

FOREIGN PATENT DOCUMENTS 298759 10/1928 United Kingdom ............ 273/61 D

*Primary Examiner*—George J. Marlo
*Attorney, Agent, or Firm*—Poms, Smith, Lande & Rose

[57] ABSTRACT

An improved tennis ball having an integrally molded valve in the sidewalls thereof for assuring constant pressure within the ball and, therefore, constant playing characteristics. The valve is characterized by being of unitary construction and having a normally open and a normally closed portion. The valve is constructed of a tapered deformable elastomeric material such that the normally closed portion seals the ball against low initial internal pressures sufficiently to allow the internal pressure within the ball to deform the normally opened portion into wedged engagement with the passageway through the wall of the ball containing the valve. As thus configured, increased internal pressure wedges the normally opened portion increasingly tightly into the passageway to provide a tight seal which is resistant to opening upon impact of the ball. The normally opened portion is provided with knife edges and a polished surface on the interior to provide leak-free sealing. The fabric covering of the tennis ball is made of a gas-permeable material disposed over the valve opening which is further protected by a gauze filter between the opening and the covering fabric. The ball can be pressurized to predictable bounce characteristics regardless of altitude and temperature by placing the ball within a sealed container at the play site and then reducing the volume of the container a fixed amount.

10 Claims, 24 Drawing Figures

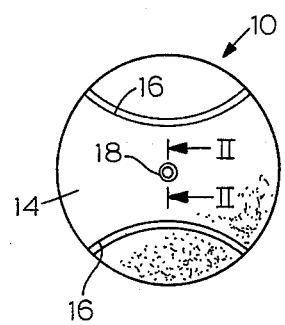
FIG 1
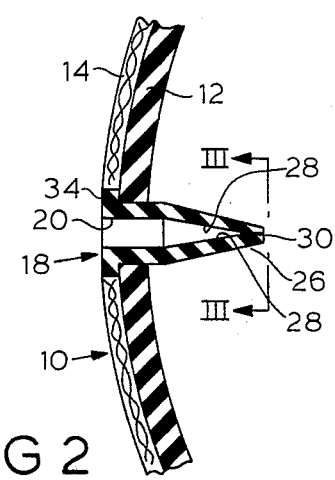
FIG 2 PRIOR ART
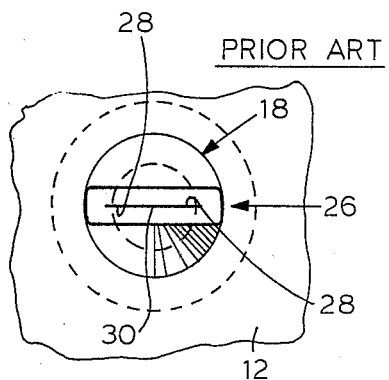
FIG 3
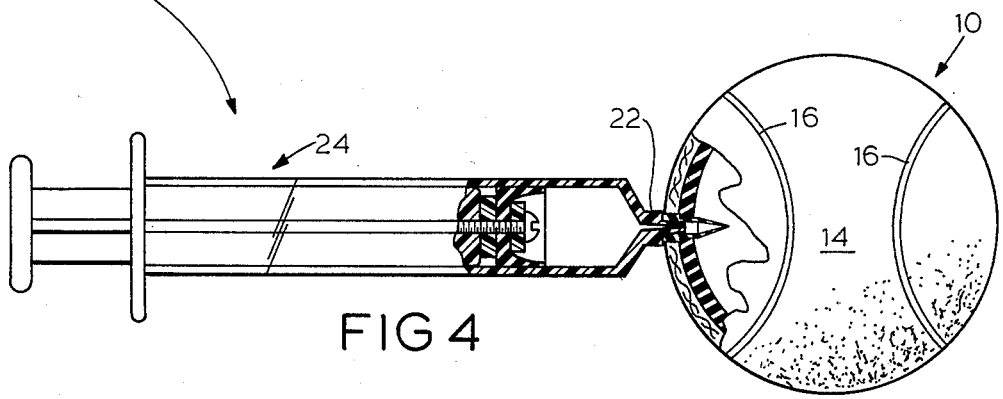
FIG 4
FIG 5 PRIOR ART
FIG 8
FIG 9
FIG 6
FIG 7 PRIOR ART

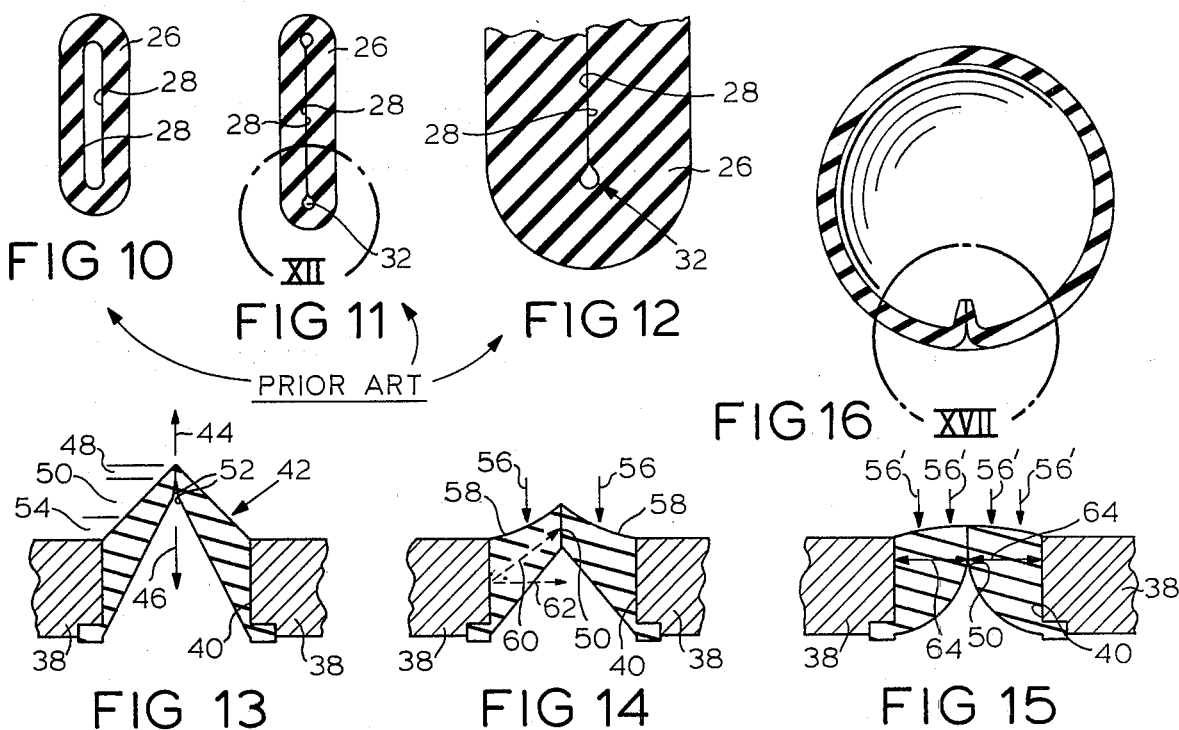

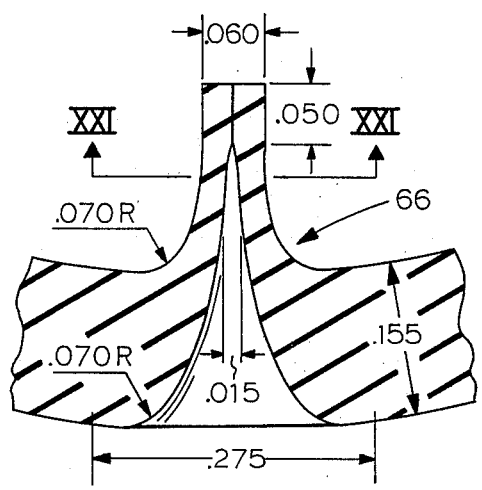
FIG 18
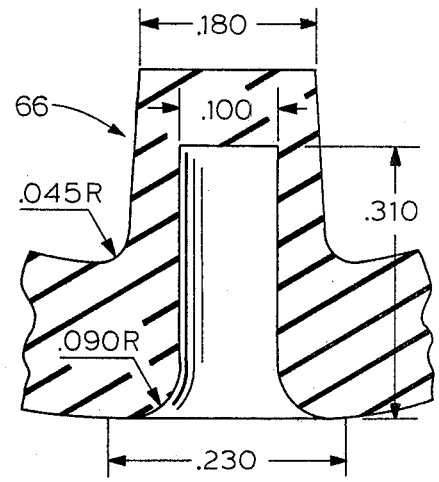
FIG 19
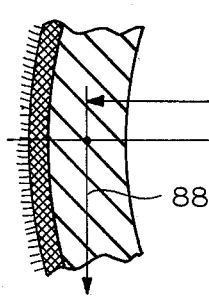
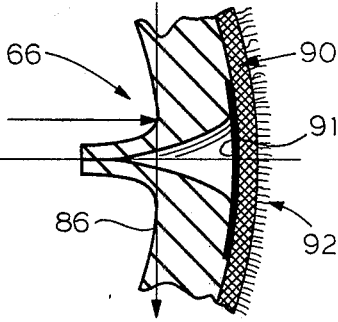
FIG 20
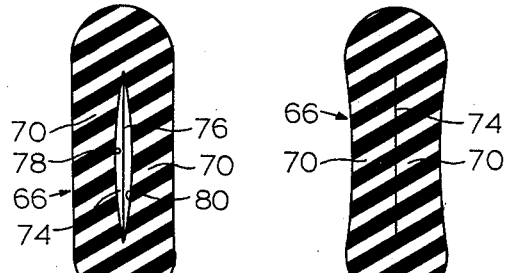
FIG 21
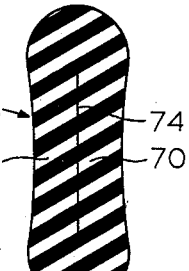
FIG 22
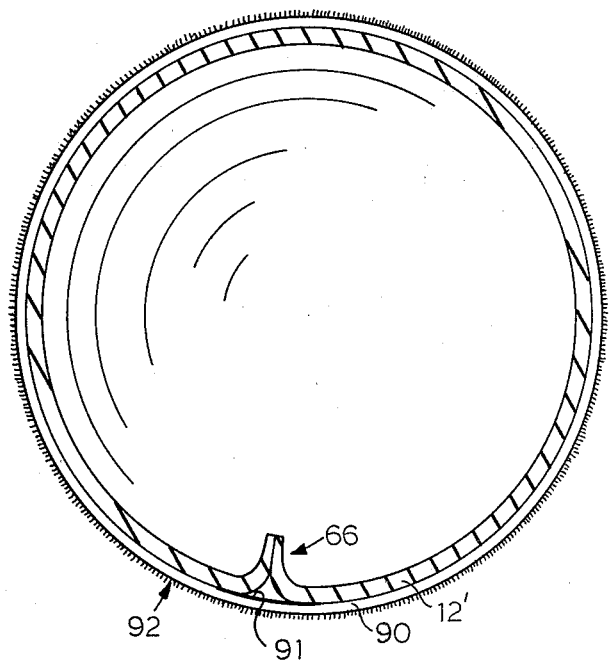
FIG 23
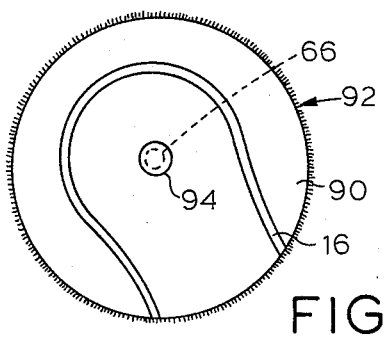
FIG 24

TENNIS BALL

BACKGROUND OF THE INVENTION

This is a Continuation-In-Part of my application Ser. No. 895,117, Filed Apr. 10, 1978, now U.S. Pat. No. 4,240,630.

Except at the novice level, players of games involving a hollow, pressurized game ball which is struck are concerned with the consistency of the playing characteristics of the ball. Tennis is certainly no exception to this rule. In fact, because of the greater occurrence of tournament play in tennis as compared with other similar games, consistency of playing characteristics of the tennis ball is of major concern.

The typical tennis ball is made of a molded spherical shell of elastomeric material, such as natural or artificial rubber. The shell is prepressurized at the factory, coated with an adhesive, and covered with two interlocking, figure-eight-shaped pieces of fabric disposed over substantially the entire surface of the tennis ball with a seam between the abutting edges to provide the characteristic tennis ball configuration. Typically, such balls are shipped in metallic containers under pressure. Upon the container being opened, the ball is subjected to atmospheric pressure. Sometimes, a brand new ball taken from the container will be "dead". That is, it will have insufficient bounce characteristics to be useful for play. As a result of varying atmospheric conditions and temperature changes, the internal pressure within a tennis ball can vary an amount such as to cause substantial differences in the bounce or playability characteristics of one tennis ball versus another.

Valves have been put into the sidewalls of inflatable bladder type playing balls for years. Balls such as footballs and basketballs having large volumes of air contained therein and subjected to infrequent and/or low level impacts can be inflated prior to a game to a desired pressure through the valve and will, thereafter maintain an acceptable level of inflation throughout the play. Moreover, the pressure within the ball and minor variations thereof are not critical to the playability of the ball.

By contrast, smaller balls which are struck as part of the game play have smaller volumes of contained air and are struck repeatedly with high impact forces. As a consequence, even minor leakage through the valve can cause changes in the internal pressure of the ball during play which is sufficient to cause a change in the playing characteristics of the ball.

The insertion of a valve into a tennis ball has been attempted in the prior art with limited success. Such a typical ball is shown with reference to FIGS. 1-4. The tennis ball, generally indicated as 10, has a molded rubber shell 12 with a fabric covering 14 adhesively attached thereto as described above and with seams 16 between the edges of the covering 14. A hole is drilled through the shell 12 and a valve, generally indicated as 18, is inserted therethrough and held in place by an appropriate adhesive. Typically, valve 18 is also made of rubber. The valve 18 comprises an outer portion 20 being cylindrical and adapted for the insertion of the cylindrical filling nib 22 of a small syringe-type pump 24 as shown in FIG. 4. Valve 18 has an inner portion 26 which allows the one-way passage of air therethrough. Typically, inner portion 26 is of the so-called "duckbill" type construction. Various forms of such duckbill valve construction are shown in FIGS. 2-7. In addition to the valve 18 being inserted through a hole made in the wall of rubber shell 12, it can be integrally molded as part of the initial molding process of shell 12 as shown in the examples of FIGS. 5, 6, and 8.

The principle of operation of a duckbill type valve is similar regardless of the specific construction. That is, the inner portion 26 terminates in a pair of opposed surfaces 28 having a slit 30 therethrough. Internal air pressure in outer portion 20 from pump 24 forces the opposed surfaces 28 apart opening slit 30 to allow the passage of air therethrough into the interior of the ball. Upon release of pressure within outer portion 20, the opposed surfaces 28 resume their original position due to the restorative nature of the elastomeric material from which they are constructed and, thereafter, the internal pressure of the ball 10 tends to hold the opposed surfaces 28 tight together. Heretofore, however, all such valves have proved ultimately unsuccessful for use in tennis balls. The reason can be understood with reference to the drawings of FIGS. 10-12.

In FIG. 10, a typical inner portion 26 of a duckbill type valve is shown in its relaxed state. Under internal pressure, it is compressed to the configuration shown in FIG. 11. As shown in the greatly expanded view of FIG. 12, however, the normal technique of constructing such duckbill valves causes an incomplete closure across the entire surface of opposed surfaces 38 creating a small passageway 32 at each side thereof. While the amount of air that can traverse the pair of passageways 32 is small, when the small initial quantity of air filling ball 10 and the number of times the ball is struck during play are considered, the air loss soon becomes appreciable on a relative basis. Moreover, opposed surfaces 28 are such that during deformation of shell 12 as caused by the high impact of tennis ball 10 against the ground and the tennis racquet, opposed surfaces 28 are not maintained in constant alignment but are "worked" back and forth relative to one another creating microscopic losses along the entire area of opposed surfaces 28.

In the prior art, the exact nature of and reason for this air loss has not been understood and, therefore, various attempts have been made to solve the problem with incomplete success. In the basic duckbill valve as shown in FIGS. 2, 3, and 5, the opposed surfaces 28 taper inwardly from outer portion 20 to meet in a small area adjacent slit 30. Since the total area of opposed surfaces 28 in contact in a pressure situation is minimal in this design, the air loss therethrough is maximum. In the configuration of FIGS. 8 and 9, opposed surfaces 28 are contained within a thin parallel projection 34 having slit 30 at the extreme inner end thereof. A further variation of this general approach is shown in FIGS. 6 and 7 wherein the parallel projection 34 has the inner end thereof sealed and small holes 36 are provided through the sidewalls of parallel projection 34 to replace the slit 30. If suffifcient holes 36 are provided to allow a reasonable filling rate through valve 18, the resultant leakage between the configuration of FIGS. 6 and 7 and that of FIGS. 8 and 9 is virtually identical. Both, however, are better than the basic duckbill configuration of FIG. 5.

In my U.S. Pat. No. 4,240,630, issued Dec. 23, 1980, I disclosed a valve particularly suited for use in a game ball. While the valve as shown therein works well in a clean environment such as encountered in racquetball, when placed in the sidewall of a tennis ball and inflated with a small handpump as taught therein, the valved tennis ball often began to leak after playing on the unclean environment of a tennis court.

It is the object of the present invention, therefore, to provide a tennis ball having an integral valve and a method for filling the ball to a constant pressure which is highly resistive to the loss of air therethrough during violent game play on the unclean surface of a tennis court.

It is a further object of the present invention to provide a tennis ball having an integral valve and a method for filling the ball to a constant pressure which is adapted to provide constant bounce characteristics regardless of the altitude and temperature at the site of play.

SUMMARY

The foregoing objectives have been met by the tennis ball of the present invention which comprises a spherical, hollow, rubber shell covered with a pair of generally figure-8-shaped pieces of fabric wherein the fabric is permeable to the passage of air therethrough and the one-way check valve of my aforementioned patent is disposed in the sidewall of the shell beneath the fabric to allow the air to pass therethrough into the ball.

In the preferred embodiment, a piece of gauze material is disposed beneath the fabric and over the opening to the valve to filter particles from the fabric which could otherwise enter the valve and destroy its sealing qualities.

To fill the ball to achieve the repeatable bounce qualities desired, the ball is placed in a canister of a fixed volume at the play site and the canister then sealed and compacted to a lesser volume such that the change in volume subjects the ball to pressure which will impart the desired bounce characteristics.

DESCRIPTION OF THE DRAWINGS

FIGS. 1–12 are drawings related to the prior art.

FIG. 1 depicts a tennis ball having a valve disposed through the sidewall thereof.

FIG. 2 is a cut-away enlarged view through the valve of the ball of FIG. 1 in the plane II—II.

FIG. 3 is an end view of the valve of FIG. 2 in the plane III—III.

FIG. 4 is a partially cut-away drawing showing a syringe-type pump being used to inflate the tennis ball of FIGS. 1–3 through the valve thereof.

FIG. 5 is a cut-away view through a standard duckbill type valve as integrally molded into the sidewall of a gameball.

FIG. 6 is a cut-away view through an integrally molded duckbill type valve according to an alternate embodiment.

FIG. 7 is a plan view of a portion of the valve of FIG. 6.

FIG. 8 is a cut-away view through yet another embodiment of a duckbill type valve.

FIG. 9 is a plan view of the valve of FIG. 8.

FIG. 10 is a cut-away view through a duckbill type valve in an unpressurized condition.

FIG. 11 is a cut-away view of a duckbill type valve in a pressurized condition.

FIG. 12 is an enlarged view of the valve of FIG. 11 in the area XII.

FIG. 13 is a drawing depicting the principle of operation of the valve of the present invention in its unpressurized state.

FIG. 14 is a cut-away view and a simplified drawing of the valve of FIG. 13 in a semi-pressurized state showing the beginning of the wedging effect employed therein.

FIG. 15 shows the valve of FIGS. 13 and 14 in its fully wedged and sealed state.

FIG. 16 is a cut-away view through the molded rubber shell of a tennis ball according to the present invention.

FIG. 17 is an enlarged view of the valve of the present invention as contained within FIG. 16 in the area XVII.

FIG. 18 is a cut-away view normal to the longitudinal dimension of the valve of FIG. 17 showing nominal dimensions thereof in a tested embodiment.

FIG. 19 is a cut-away view longitudinally through the valve of FIG. 17 showing the dimensions of the tested embodiment thereof.

FIG. 20 is a partially cut-away drawing through a portion of a tennis ball depicting the ideal balance characteristics of the valve of the present invention as incorporated in a tennis ball.

FIG. 21 is a cut-away view through the inner portion of the valve according to the present invention in its unpressurized state.

FIG. 22 is a cut-away view through the inner portion of the valve of the present invention in its pressurized state.

FIG. 23 is a cut-away view through a completed tennis ball according to the present invention.

FIG. 24 is a view of the outside of a tennis ball according to the present invention in its preferred embodiment.

DESCRIPTION OF THE PREFERRED EMBODIMENT

The valve employed in the present invention works on a combination of wedging action and improved sealing surfaces. The preferred embodiment of the tennis ball described hereinafter, employs minimum diameter, heat bonded valve insert, similar to the one indicated as 42 in the simplified drawing of FIGS. 13–15, but with the outer surface below the fabric covering as described hereinafter. The valve can also be integrally molded as shown.

Valve 42 is disposed within a hole (passageway) 40 provided in the rigid sidewall 38 of a container. As shown in FIG. 13, valve 42 is disposed to allow fluid passage in the direction of arrow 44 and to prevent fluid passage in the direction of arrow 46. Valve 42 is of unitary construction and is molded of a soft pliable elastomeric material. Soft natural rubber is preferred. However, any material having the deformation and sealing qualities of soft, natural rubber can be employed. Valve 42 is annular in shape and of such a thickness adjacent the sides of hole 40 that, in conjunction with the support provided by the sidewalls of hole 40, it resists deformation in the axial direction close adjacent the sidewalls of hole 40. Valve 42, however, tapers radially inward and axially in the direction of desired fluid flow (i.e. in the direction of arrow 44) becoming thinner the further it gets from the sidewalls of hole 40. Valve 42 tapers together becoming oval in cross section and ultimately coming into sealed mating relationship at the opposite end thereof from the end in contact with the sidewalls of hole 40. Being of a deformable elastomeric material, such as soft rubber, and tapering towards increased thinness, valve 42 becomes more readily deformable towards the center of hole 42. As can be seen in FIG. 13, with no pressure applied, valve 42 is disposed with the portion at the extreme inner ends thereof, labeled 48, in sealed mating contact. Portion 48, therefore, forms a normally closed valve which resists fluid flow in the direction of arrow 46 but which will part (open) to allow the passage of fluid in the direction of arrow 44. Below normally closed portion 48 is a normally open portion 50. That is, the facing inner surfaces 52 of valve 42 in the area 50 are separated to provide a passage therethrough. The balance of valve 42 can be considered as an annular body portion, which has been labeled as 54 for convenience.

Referring now to FIG. 14, the action of valve 42 upon the introduction of fluid pressure in the direction of arrow 46 is shown. Fluid (as represented by the arrows 56) is initially prevented from passing through valve 42 by the action of normally closed portion 48. Accordingly, fluid 56 presses on the upper surfaces 58 of valve 42. Valve 42, therefore, begins to deform into hole 42 from the pressure of fluid 56. As previously mentioned, valve 42 is more readily deformable adjacent the center thereof and becomes increasingly less deformable adjacent the sidewalls of hole 40 (i.e. in the area of annular body portion 54). Consequently, facing internal surfaces 52 of normally opened portion 50 are first brought into sealed contact as valve 42 assumes the position of FIG. 14.

Valve 42 is contructed such that the length at any point about the periphery thereof from the sidewall of hole 40 to the facing internal surfaces 52 (as indicated by the dashed arrow 60) is longer than the radius of the hole 40 at the same point (as indicated by the dashed arrow 62). This being the case, as greater fluid pressure is created, as indicated by the heavier arrows 56' in FIG. 15, valve 42 is tightly wedged into hole 40 in an increasing basis as the pressure of fluid 56 is increased. Since valve 42 is of a deformable elastomeric material, such as rubber, internal compression forces as indicated by arrows 64 are created within valve 42 between the sidewalls of hole 40 acting on the facing internal surfaces 52 of both normally closed portion 48 and normally open (now closed) portion 50 tending to hold valve 42 tightly closed in the presence of shocks and forces. Additional features and benefits will be described hereinafter.

Referring now to FIGS. 16 through 19, the foregoing operation can be seen as it is applied to the preferred embodiment of the present invention incorporated as an integral molded valve in the molded rubber shell 12' of a tennis ball. In this embodiment, the valve, generally indicated as 66, is in the form of an inwardly projecting, flattened tubular nipple 68, having rounded edges (as shown in FIGS. 21 and 22) and flat sides 70 and 72 which are separated by an internal cavity 74. The cavity 74 becomes bell-shaped as it approaches and opens to the exterior of the ball's rubber shell 12. That is, the cavity smoothly curves from being substantially normal to the surface of the shell 12 on the inner end to being tangential to the shell's surface at the exterior end. At its inner extremity, the nipple 68 is initially molded with a solid closed end, which is lanced through with a sharp blade, leaving a slit 76 that is normally held closed by the elasticity of the rubber but which can be forceably spread apart, as when the air pressure in the cavity 74 is greater than the pressure inside the ball.

The construction of the cavity 94 provides, in combination with the wedging action described herein, the virtually leak-proof benefits of the present invention even in high-shock game play. The cavity 74 has been formed by molding it employing a male mold piece having knife edges and a mirror-smooth polished surface for the portion forming at least the inner half of cavity 74. As a result, the formed cavity 74, for at least the inner half of its length, is a laterally-elongated narrow slit having slightly spaced mirror-smooth facing surfaces 78 and 80. The slit tapers to the lateral knife edges shown in FIG. 21.

By employing the polished surfaces and knife edges of the present invention, the heretofore unrecognized leakage paths of prior art game ball check valves as discussed above are eliminated. As a result, when the nipple 68 is collapsed by air pressure within the ball, a portion of the cavity 74 is closed and sealed airtight. In this collapsed or closed condition, coupled with the wedging action, the valve 66 is tightly sealed against leakage and no air escapes from the ball even during the most violent game play.

The relationship of the valve 66 to the method of operation of the wedging action thereof, hereinbefore described in simplified form with reference to FIGS. 13-15, can best be understood with reference to FIG. 17 wherein valve 66 is shown in superimposed normal and pressurized states. The normal position is shown with the ghosted lines and the pressurized state is shown in the solid lines. As can be seen, the area of nipple 68 containing the lanced slit 76 comprises the normally closed portion. In like manner, the area of nipple 68 comprising flat sides 70 and 72 separated by internal cavity 74 (having the described knife edges and polished surfaces) comprises the normally opened portion. The area of rubber of the shell bounded by the dashed lines 82 is the passageway (hole) and is, accordingly, labeled 40' for relation to the previous discussion relative to FIGS. 13-15. Valve 66 as shown in the ghosted position of FIG. 17 corresponds to simplified valve 42 of FIG. 13. Thus, in corresponding fashion, when the ball is being inflated from no or very low internal pressure, the lanced slit 76 serves as an initial seal to prevent air from leaking out before enough pressure can be built up within the ball to collapse the sidewalls of the nipple 68.

As air pressure builds up, the nipple 68 collapses from the lateral pressure forces and the polished surfaces 66, 80 close against one another to form the secondary airtight seal that is capable of holding the relatively high shock load pressures that are created when a fully inflated ball is hit hard by a racquet. Then, as internal pressure (indicated by the arrows 84) continues to increase, the valves 66 is deformed increasingly into wedged contact with the sidewalls of the integral hole 40'. Since the length of the nipple 68 from the boundary line 82 at any point is longer than the radius of the passageway 40' at the point (in the same manner as described in relation to FIG. 14), the internal compressive forces indicated by the arrows 56' are created in the same fashion as previously described with relation to FIG. 15.

It is these internal compressive forces 56' which maintain valve 66 in its tightly closed state under the relatively high shock load pressures previously described as being a necessity for acceptable operation within the desired environment. This is true even if the passageway expands due to stretching of the rubber. The compressive forces 56' remain as long as the radial distance at each point around the periphery of the valve 66 remains less than the radial length of the normally opened portion of valve 66 at the same point (i.e. the relationship of dotted arrows 60 and 62 of FIG. 14 holds).

It is worthy of note that the design of the valve 66 is such that when constructed of substantially similar material to the ball, the total volume of rubber in the nipple 68 is almost exactly the same as the airspace volume of the cavity 74. Additionally, as shown in FIG. 20, the valve 66 is distributed along a radius line such that its slightly heavier weight (as shown by the arrow 86) acts through the radial distance $d_2$ which is slightly shorter than the distance $d_1$ through which the weight opposite (shown by arrow 88) acts such that the rotational forces on the ball are equal and opposite making the ball dynamically balanced. As a consequence, the valve 66 has no appreciable effect on the balance of a tennis ball wherein it is disposed.

For convenience in understanding the size relationship involved, FIGS. 18 and 19 show the dimensions of such a valve as actually constructed and tested in playing ball. Turning now to FIGS. 23 and 24, having thus prepared the molded rubber shell 12' with valve 66 incorporated therein, 12' is covered in the usual manner with a pair of generally figure-8-shaped pieces of felt fabric 90 as shown in FIG. 24 to form the classic tennis ball covering. Fabric 90 for the present invention should be of an air-permeable material and is placed, as shown in FIG. 24, with the fabric 90 covering the opening to valve 66. Fabric 90 is adhesively attached to rubber shell 12' in the usual manner and care should be taken to prevent the adhesive from entry into the opening of valve 66.

Additionally, it is preferred to further separate the opening to valve 66 from any possible contamination by first covering it with a disc or patch 91 of gauze material. In tested balls without the gauze material, the objectives of preventing the dirt and contamination of the playing environment were met, but, after a time, the balls unexpectedly leaked. It was finally determined that a single fiber dislodged from the surface of the felt fabric normally used to cover tennis balls which was found acceptable and used as fabric 90 to cover the valved tennis balls was sufficient to enter the valve 66 and destroy its unique sealing qualities. The gauze filter patch 91, being free of loose fibers, filters the opening of valve 66 and keeps it in good sealing condition. While other materials could be used, the gauze is preferred since it is thin and practically weightless in the size required so that the weight and balance of the ball is not affected thereby.

The tennis ball 92 thus formed can be pressurized by placing the ball 92 into any of a number of pressurizable containers presently available for shipping and/or storing tennis balls under pressure. In this regard, the fabric covering 90 serves two functions. Being permeable, it allows the air to pass therethrough and through valve 66 to the interior of ball 92. Moreover, since the sealing qualities of valve 66 depend upon the firm mating of the mirror-smooth sidewalls to achieve the desired pressure retention results, fabric 90 serves as a filter to prevent the entry of small foreign particles into valve 66 which would cause valve 66 to lose its pressure-retention capabilities as discussed above.

It was discovered that the valved tennis ball of the present invention could also be filled in a manner which would impart predictably repeatable bounce characteristics regardless of the altitude or temperature at the game site. It is usual to fill game balls by applying a fixed pressure. With the valved tennis ball of the present invention which has no exposed opening through which to apply a fixed pressure source a different means of pressurizing was found necessary. Several varieties of storage container for prepressurized game balls are available in the art. Since all tennis and racquet balls to date have come prepressurized from the factory and lose their bounce characteristics as a result of the loss of the filling gas. By placing the balls into a sealed container under greater external pressure, the escape of the filling gas is prevented during storage. Earlier versions of such storage devices contained pumps or fittings for the attaching of a pump. Some had gauges, but most had none. Recently, a storage canister has been made commercially available which works on the principle of a change of volume. This device is described in U.S. Pat. No. 3,897,874 to Coons and is the preferred device for practicing the pressurizing method described hereinafter.

As with the other prior art storage devices, the Coons container is intended only for storing tennis and racquet balls under a pressure so as to prevent or retard depressurization. The balls are placed within the container and the container then sealed at a first volume by covering the opening with an O-ring sealed cover. The cover is threadedly engaged with the container so that as the cover is threaded onto the container, the internal volume is decreased to a smaller second volume. The balls inside are of fixed volumes which occupy most of the internal volume of the container so that the change of volume creates sufficient pressure to prevent or retard the depressurization of the balls contained therein. That is, if the fixed volume of the balls is $V1$, the first volume of the container is $V2$, and the compressed volume of the container is $V3$, the space is reduced from $V2-V1$ to $V3-V1$ or the change in volume is $V2-V3$.

If, rather than prepressurizing the tennis ball as is the usual custom, the tennis ball of the present invention is pressurized at the play site by placing it in the above-described container and subjected to the on-site change of volume pressurization rather than pressurizing it to a fixed gauge pressure, the tennis ball will be pressurized in a manner which compensates for the altitude and temperature and, thereby, be pressurized in a manner which imparts the same bounce characteristics regardless of the altitude and temperature of the site.

With tennis ball 92 incorporating valve 66, if it should be necessary to reduce the inflation pressure, all that is necessary is to insert a toothpick, paper clip, or the like into the valve opening so as to spread the sealing lips part and break the seal. It has been found that the adjusted pressure can be set to an accuracy of +or − a fraction of an inch of mercury employing the valve of the present invention. it has been found that changes in the altitude of play or temperature variations can cause a necessity for the release of excess pressure within the ball and subsequent repressurization to a desired new pressure to provide proper playability. To this end, in the preferred embodiment as shown in FIG. 24, fabric cover 90 is provided with an indicia 94 over the location of valve 66 so that a toothpick, paper clip, or the like can be passed through the fabric 90 to open valve 66 in the above-described manner to relieve the pressure within ball 92. Indicia 94 is conveniently in the form of a dot or circle of ink applied to fabric 90 at the proper location.

Having thus described my invention, I claim:

1. In a tennis ball having a spherical, hollow, rubber shell covered with a pair of generally figure-8-shaped pieces of fabric, the improvement characterized by the fabric being permeable to the passage of air therethrough and by a one-way check valve disposed in the sidewall of the shell beneath the fabric for allowing air to pass therethrough into the ball.

2. A tennis ball comprising:
   (a) a spherical, hollow, rubber shell having a bore through the sidewall thereof;
   (b) a unitary check valve disposed in the bore for sealing the bore to allow pressurized fluid to flow axilly through the bore in one direction and prevent pressurized fluid from flowing axially through the bore in the opposite direction, said valve comprising,
   (b1) an annular body portion carried coaxially within the bore, said body portion being thick enough in the axial direction adjacent the outer edges of the bore that in combination with the support provided by the material defining the bore said portion is substantially non-deformable in the axial direction, and,
   (b2) a sealing nipple portion carried within said body portion tapering radially inward and axially in the direction of desired fluid flow from said body portion on one end to meet in sealed contact adjacent the opposite end, the thickness of said sealing nipple portion in the axial direction becoming increasingly thinner and correspondingly increasingly deformable in the axial direction radially inward from said one end whereby the application of fluid under pressure to said valve in the direction opposite desired fluid flow causes said nipple portion to be deformed axially into said body portion in a wedging action increasingly sealing the passageway as increased fluid pressure is applied, said taper being a smooth curve extending from a point on a line substantially normal to the axis of the bore on said one end to a point on a line substantially parallel to the axis of the bore on said other end whereby fluid pressure within the bore tending to move fluid through the bore in a non-desired direction acts normal to the axis on said nipple portion adjacent said other end to initially prevent fluid passage therethrough as it also acts axially on the rest of said nipple portion to deform said nipple portion in said wedging action into said body portion, said nipple portion being of a material having the deformation and sealing qualities of soft natural rubber, the surfaces of said nipple portion that meet during said wedging deformation into said body portion having a finish produced by a mirror-smooth mold; and,
   (c) a pair of generally figure-8-shaped pieces of fabric bonded to the outer surface of said shell with narrow seams between the abutting edges thereof, said fabric being permeable to the pressurizing fluid and covering the outer opening to said valve.

3. The tennis ball of claim 2 wherein:
the length of said nipple portion from said one end to said other end is sufficiently long in relation to the deformability thereof that said other end remains in sealed contact and said nipple portion still deformably wedges into said body portion when said body portion is deformed radially outward by expansion of the material defining the bore.

4. The tennis ball of claim 2 wherein:
said mirror-smooth inner surfaces that are pressed together in fluid-tight sealing engagement come together in knife edges.

5. The tennis ball of claim 2 and additionally comprising:
filter means disposed over the outer opening of said check valve and under said fabric for filtering out fibers from said fabric which would otherwise, if dislodged, enter said check valve and deminish its sealing qualities.

6. The tennis ball of claim 5 wherein:
said filter means comprises a piece of gauze material.

7. A tennis ball comprising:
   (a) a molded, spherical, hollow, rubber shell having a unitary check valve of elastomeric material integrally molded into the sidewall thereof, said valve comprising a substantially flattened tubular nipple portion having external rounded edges and generally flat sides defining an internal cavity with an elongated axis, said cavity smoothly curving from a point on a line normal to said axis of the entrance end of said nipple to a point on a line parallel to said axis as it approaches and opens to the interior end of said nipple, said nipple having an inner end defining an inner extremity of said cavity, said inner end being a solid closed end having a thin slit therethrough which communictes with said cavity, said slit being normally held closed by the elasticity of the elastomeric material, said cavity being configured for at least an inner half of its length in the form of a laterally elongated narrow slit having spaced walls produced from a mirror-smooth mold, said walls tapering down to lateral knife edges, said cavity being further configured at its inner end adjacent said solid end of said nipple by its tapering down to a knife edge adjacent and communicating with said thin-slit opening; and,
   (b) a pair of generally figure-8-shaped pieces of fabric bonded to the outer surface of said shell with narrow seams between the abutting edges thereof, said fabric being permeable to the pressurizing fluid and covering the outer opening to said valve.

8. The tennis ball of claim 7 and additionally comprising:
filter means disposed over the outer opening of said check valve and under said fabric for filtering out fibers from said fabric which would otherwise, if dislodged, enter said check valve and deminish its sealing qualities.

9. the tennis ball of claim 8 wherein:
said filter means comprises a piece of gauze material.

10. The method of producing a tennis ball having predictable and repreatable bounce characteristics at different altitudes and temperatures comprising the steps of:
   (a) producing a spherical, hollow, rubber shell having a bore through the sidewall thereof which bore contains a unitary check valve for sealing the bore to allow pressurized fluid to flow axially through the bore in one direction and prevent pressurized fluid from flowing axially through the bore in the opposite direction, said valve comprising,
   (a1) an annular body portion carried coaxially within the bore, said body portion being thick enough in the axial direction adjacent the outer edges of the bore that in combination with the support provided by the material defining the bore said portion is substantially non-deformable in the axial direction, and, (a2) a sealing nipple portion carried within said body portion tapering radially inward and axially in the direction of desired fluid flow from said body portion on one end to meet in sealed contact adjacent the opposite end, the thickness of said sealing nipple portion in the axial direction becoming increasingly thinner and correspondingly increasingly deformable in the axial direction radially inward from said one end whereby the application of fluid under pressure to said valve in the direction opposite desired fluid flow causes said nipple portion to be deformed axially into said body portion in a wedging action increasingly sealing the passageway as increased fluid pressure is applied, said taper being a smooth curve extending from a point on a line substantially normal to the axis of the bore on said one end to a point on a line substantially parallel to the axis of the bore on said other end whereby fluid pressure within the bore tending to move fluid through the bore in a non-desired direction acts normal to the axis on said nipple portion adjacent said other end to initially prevent fluid passage therethrough as it also acts axially on the rest of said nipple portion to deform said nipple portion in said wedging action into said body portion, said nipple portion being of a material hving the deformtion and sealing qualities of soft natural rubber, the surfaces of said nipple portion that meet during said wedging deformation into said body portion having a finish produced by a mirror-smooth mold;

(b) bonding a pair of generally figure-8-shaped pieces of fabric to the outer surface of said shell with narrow seams between the abutting edges thereof, said fabric being permeable to the pressurizing fluid and covering the outer opening to said valve; and, (c) at the altitude and temperature whereat the tennis ball is to be used for play, placing the tennis ball being of a given volume V1 into a collapsable container having a given internal volume V2, sealing the container and compressing the container to a second given internal volume V3 wherein the change in volume (V3-V2) is sufficient to place the tennis ball under a pressure which will impart the desired bounce characteristics to it.

* * * * *